Nov. 19, 1935.  H. SAUER  2,021,202
LOCKING DEVICE FOR FOLDABLE MEASURES
Filed Jan. 15, 1935
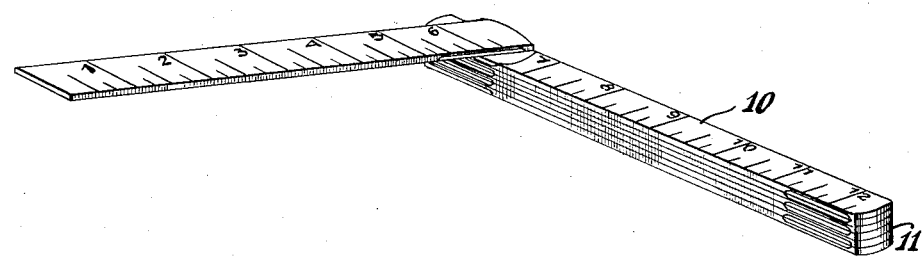
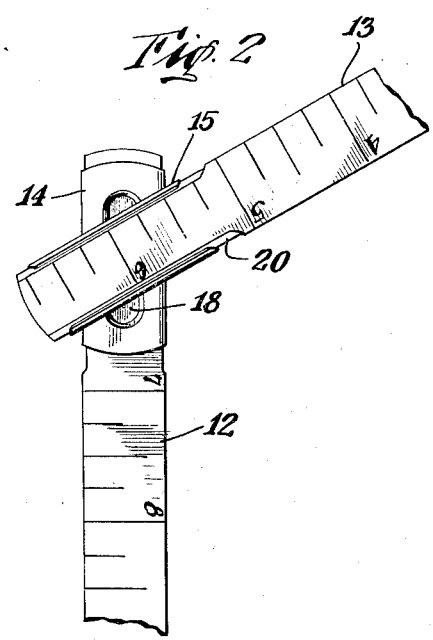
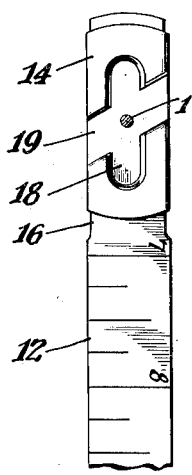
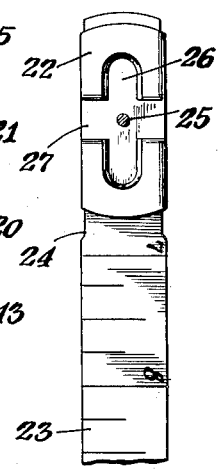
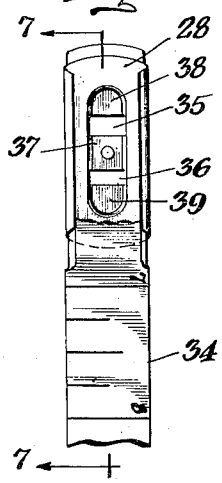
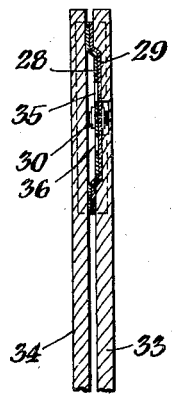
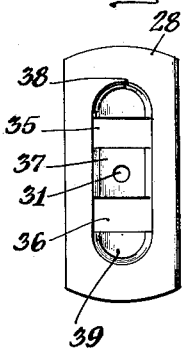
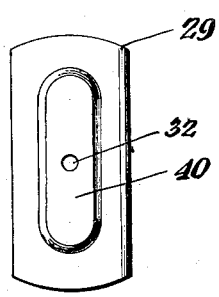
INVENTOR
Henry Sauer
BY
ATTORNEY Patented Nov. 19, 1935

2,021,202

UNITED STATES PATENT OFFICE 2,021,202

LOCKING DEVICE FOR FOLDABLE MEASURES

Henry Sauer, New York, N. Y.

Application January 15, 1935, Serial No. 1,868

2 Claims. (Cl. 33—105)

This invention relates to improvements in folding measures or scales, particularly in the means uniting the adjoining ends of the various units or sections of such instruments, and it is the principal object of my invention to provide novel and improved locks for two adjoining units locking the same at a suitable or desired angle to one another.

Another object of my invention is the provision of a lock for the adjoining units of a foldable measure composed of two associate members one provided with grooves and the other with a raised portion or ridge to engage said grooves to either allow the usual folding of the single units or sections of the instrument parallel to one another or to lock the units at a desired angle to one another to facilitate the work of carpenters or other mechanics by dispensing with the use of a separate means to measure certain angles of the work at hand.

A further object of my invention is the provision of a foldable measure equipped with locking members of a comparatively simple and therefore inexpensive construction, yet durable and highly efficient in use.

A still further object of my invention is the provision of a lock for locking the single units or sections of a foldable measure or scale at a desired angle to one another which can be readily attached to any of the rules at present in use without material or extensive changes in their construction.

These and other objects and advantages of my invention will become more fully known as the description thereof proceeds and will then be specifically defined in the appended claims.

In the accompanying drawing forming a material part of this disclosure:

Fig. 1 is a perspective view of a sectional folding measure or scale equipped with a lock constructed according to my invention.

Fig. 2 is a fragmentary front elevation thereof.

Fig. 3 is a fragmentary front elevation of one section or unit of a scale equipped with a locking member to lock two adjoining sections of the scale at an angle to one another as for instance shown in Figure 2.

Fig. 4 is a view similar to Fig. 3 illustrating the associate locking member for the one illustrated in Figure 3.

Fig. 5 is a fragmentary front elevation of a ruler unit equipped with a modified form of locking member with which the associate locking member Figure 4 may also be used.

Fig. 6 is a fragmentary view of a measure equipped with another modified form of locking member.

Fig. 7 is a section on line 7—7 of Figure 6.

Fig. 8 is a detail view of one locking member for the unit, Figure 6, and

Fig. 9 is a detail view of the locking member associated with the member, Figure 8.

As illustrated, a foldable measure or scale 10 composed of any number of units or sections 11 foldably connected in the usual, well known manner has some or any number of adjoining units as for instance 12, 13 connected by the locking member 14 attached to units 12, and its associate member 15 attached to unit 13.

Member 14 is attached in the usual manner to unit 12 by its bent engaging side flanges pressed against the side edges of the reduced part 16 of the unit 12 and pivotally secured thereto by means of a pin 17 also passing through member 15 and into the reduced ends of the adjoining units.

The outer face of locking member 14 has formed therein a depression or groove 18 extending in the direction of the longitudinal axis of the member and a depression or groove 19 intersecting groove 18 at an angle thereto.

The associate locking member co-operating with member 14 and designated 15 is secured in a similar manner as member 14 to the reduced end 20 of measure unit or section 12. Locking member 15 has a raised portion 21 formed in its middle extending in the direction of its longitudinal axis and of a size to fit grooves 18 and 19 in member 14.

It will be clear that upon the uniting of units 12 and 13 by their pivot pin 17, the raised portion 21 will engage normally the longitudinal groove 18 of unit 12 and if turned about the pivot pin will engage in groove 19 of member 14 and will lock both units 12 and 13 at an angle to one another determined by the slant of groove 19.

In Figure 5, I have shown a modified form of locking member designated 22 and secured in the above described manner to its measure unit 23 having a reduced end 24 and a pivot pin 25.

In this form of my invention the locking member 22 has a longitudinally extending groove 26 and a groove 27 intersecting said groove at an angle of 90°.

It will be clear that if locking member 15 is used with member 22 its raised portion 21 will engage the groove 27 of member 22 and lock the measure units at an angle of 90° to one another.

The use and operation of my device will be readily understood from the foregoing description by having simultaneous reference to the drawing without further explanation.

It will be further understood that I have described and shown the preferred form of my invention as one example only of the many possible ways to practically construct the same and that I may make such changes in its general arrangement and in the construction of the minor details thereof without departing from the spirit of my invention and the principles involved.

Having thus described my invention what I claim as new and desire to secure by Letters Patent is:

1. A lock for locking two pivotally connected adjoining sections of a foldable scale or ruler at a predetermined angle to one another comprising a member attached to one of the sections and provided with a longitudinally extending groove and a groove intersecting said longitudinal groove at an angle, an associate member attached to the adjoining section of the scale, and a ridge or raised portion of said associate member adapted to normally engage the longitudinal groove and upon displacement of the two sections relatively to one another to engage the intersecting groove to lock both sections at an angle to one another, the size of the angle to be determined by the angle of intersection between the grooves in one of said members.

2. A lock for locking two pivotally connected adjoining sections of a foldable measure at a right angle to one another comprising a locking member attached to one of said sections and having a longitudinally extending groove and a groove intersecting said longitudinal groove at a right angle, an associate locking member attached to the other adjoining section of the measure, a raised portion formed with said associate member adapted to normally engage the longitudinal groove and upon turning of one section at a right angle to the other adjoining section to engage the groove intersecting said longitudinal groove at a right angle to lock the sections of the measure at a right angle to one another.

HENRY SAUER.